UNITED STATES PATENT OFFICE.

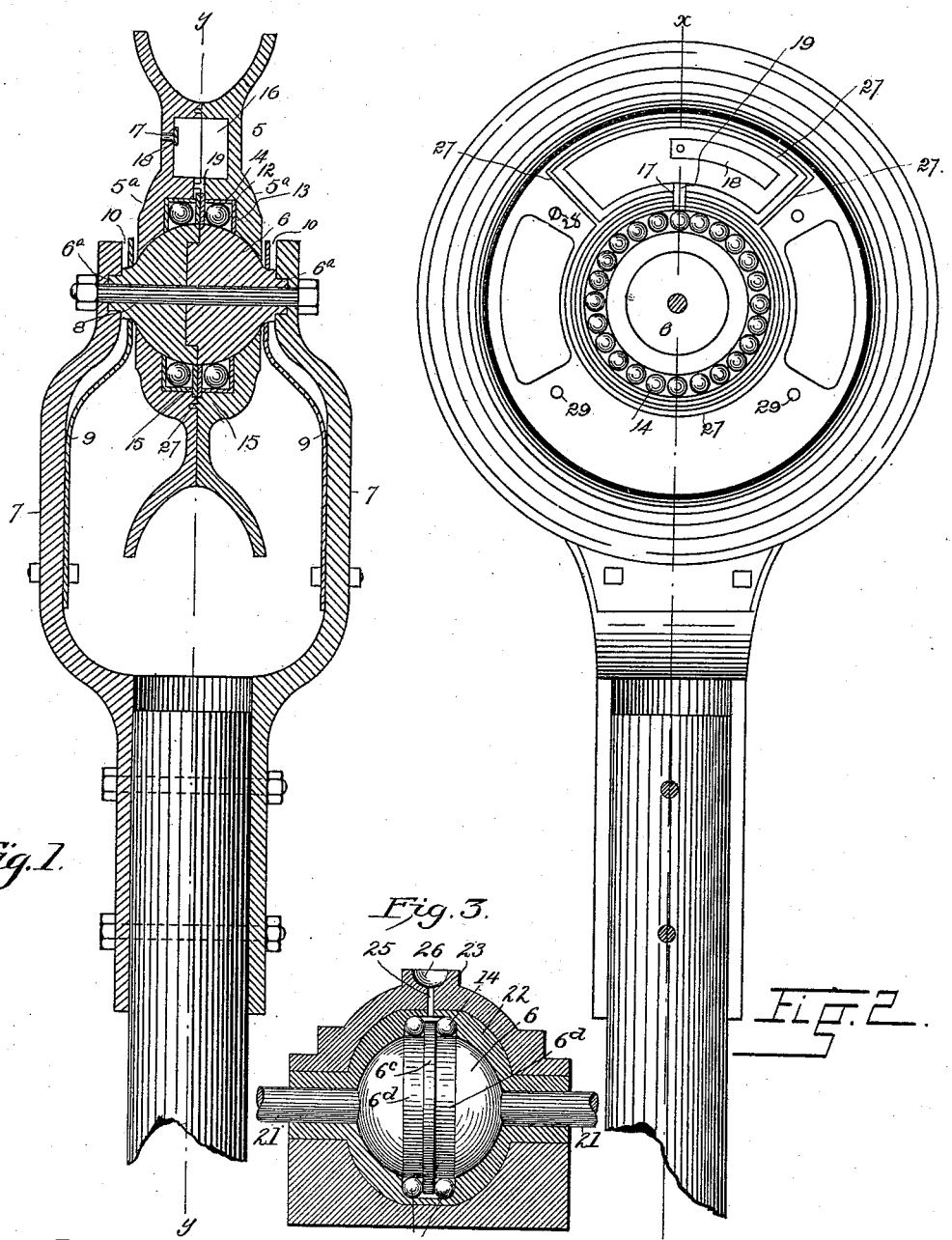

JAMES W. HOWARD, OF DENVER, COLORADO.

BALL-BEARING.

SPECIFICATION forming part of Letters Patent No. 526,013, dated September 11, 1894.

Application filed May 2, 1894. Serial No. 509,737. (No model.)

*To all whom it may concern:*

Be it known that I, JAMES W. HOWARD, a citizen of the United States of America, residing at Denver, in the county of Arapahoe and State of Colorado, have invented certain new and useful Improvements in Ball-Bearings; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in ball bearings, and consists of the construction hereinafter described and claimed, all of which will be fully understood by reference to the accompanying drawings in which is illustrated an embodiment thereof.

In the drawings, Figure 1 shows my improved bearing applied to a trolley wheel. This view is a section taken on the line $x$—$x$, Fig. 2. Fig. 2 is a section taken on the line $y$—$y$, Fig. 1. Fig. 3 illustrates the bearing as applied to a rotating axle or spindle, the box being stationary.

Similar reference characters indicate corresponding parts or elements of the mechanism in the several views.

Let the numeral 5 designate a trolley wheel, composed of two parts, $5^a$ substantially identical. The inner or bearing surface of this wheel is concaved to fit the spherical surface of the ball 6 held fast by the arms 7 of the fork, which embrace the ball. The ball is slightly elongated on two diametrically opposite sides as shown at $6^a$, where it is fashioned to enter angular recesses formed in the arms. The arms are held in operative relation with the ball by means of a bolt 8 which passes through an opening formed in the center of the ball axle, and coinciding apertures formed in the arms of the fork. The head of the bolt engages one arm of the fork, while a nut screwed upon the opposite extremity engages the other arm of the fork.

To the inner surface of each arm 7 is secured one extremity of a spring plate 9. The opposite extremities of these plates are apertured to receive the elongated extremities of the ball axle, and are located between the hub of the wheel and the arms of the fork where a space 10 is left on each side to allow the wheel a certain movement, whereby it may adjust itself to the direction of the wire in making turns. The tendency of the springs is to maintain the wheel in the normal position, or that which it would naturally occupy where the trolley wire follows a straight line; but the springs have sufficient movement to permit the automatic adjustment stated. The object of this adjustment is to keep the groove of the wheel in line with the direction of the engaging wire, since if this relation between the wire and the wheel is not preserved, or if the wire occupies an angular position in the groove, the friction is increased to such an extent that the wheel is very soon worn out or destroyed.

Each part $5^a$ of the wheel is provided with a circular groove or recess 12 having a detachable steel lining 13. These grooves are filled with balls 14 which engage the ball axle 6. Each part of the wheel is provided with a steel washer 15 which holds the balls in place on the inner, or adjacent sides of the grooves.

The wheel is provided with an oil chamber 16 which may be filled with any suitable lubricating material, which passes to the bearing surface of the wheel and axle through an aperture 19. The lubricant is introduced to the chamber 16 through an aperture 17 normally closed by a spring stopper 18.

In the construction shown in Fig. 3, the ball 6 is fast on a shaft or axle 21, and the bushing 22 of the box 23 is recessed to receive the small balls 14. The two nests of balls are separated by the collar $6^c$ formed integral with the ball 6. On each side of this collar, the ball is flattened, forming a circumferential face or zone $6^b$ which engages the small balls 14.

When used in connection with the trolley wheel, the ball 6 is preferably formed in two parts as indicated in Figs. 1 and 2, since this construction facilitates the placing of the small balls in position when assembling or arranging the elements of the mechanism in operative relation.

The two parts of the trolley wheel are provided with counterpart tongues and grooves formed on the engaging surfaces as shown at 27. (See Figs. 1 and 2.) These trolley parts, when placed in position, are secured together by screws 28 inserted in apertures 29.

In assembling the parts, the small balls 14 are placed in the recesses 12 of the respective parts of the trolley, and in contact with the respective parts of the ball 6, which are also in position. The washers 15 are then put in place, and the two parts of the trolley placed together and fastened. The arms 7 of the fork, carrying the springs 9, are then attached to the extremities of the ball axle, after which, the bolt 8 is inserted and fastened by the nut.

Having thus described my invention, what I claim is—

1. In a ball bearing, the combination of the axle having a spherical bearing surface, the part engaging said surface being shaped to receive the spherical part of the axle and provided with an interior recess surrounding said part, and small balls located in said recess and engaging the spherical part of the axle, substantially as described.

2. In a ball bearing, the combination of the axle having a spherical bearing surface, the hub of the wheel shaped to engage the spherical part of the axle and provided with a recess surrounding said part, and small balls located in said recess and engaging the spherical part of the axle, substantially as described.

In testimony whereof I affix my signature in the presence of two witnesses.

JAMES W. HOWARD.

Witnesses:
   G. J. ROLLANDET,
   CHAS. E. DAWSON.